United States Patent [19]

Coran et al.

[11] 4,271,049

[45] Jun. 2, 1981

[54] ELASTOPLASTIC COMPOSITIONS OF CURED DIENE RUBBER AND POLYPROPYLENE

[75] Inventors: Aubert Y. Coran; Raman Patel, both of Akron, Ohio

[73] Assignee: Monsanto Company, St. Louis, Mo.

[21] Appl. No.: 75,371

[22] Filed: Sep. 10, 1979

[51] Int. Cl.³ .................... C08L 7/00; C08L 23/00
[52] U.S. Cl. ..................... 260/4 R; 260/5; 525/191; 525/192; 525/232; 525/240
[58] Field of Search ............... 260/4 R, 5; 525/191, 525/192, 232, 240

[56] References Cited

U.S. PATENT DOCUMENTS

| | | | |
|---|---|---|---|
| 2,972,600 | 2/1961 | Braidwood | 528/129 |
| 3,037,954 | 6/1962 | Gessler et al. | 525/215 |
| 3,093,613 | 6/1963 | Fusco et al. | 525/480 |
| 3,287,440 | 11/1966 | Giller | 525/502 |
| 3,709,840 | 1/1973 | Dehoff | 528/112 |
| 4,104,210 | 8/1978 | Coran et al. | 525/203 |
| 4,130,534 | 12/1978 | Coran et al. | 525/232 |
| 4,141,863 | 2/1979 | Coran et al. | 260/4 R |
| 4,141,878 | 2/1979 | Coran et al. | 525/240 |

OTHER PUBLICATIONS

Natural Rubber Technology, vol. 9, Part 2, 1978, pp. 21-31, Campbell et al.

*Primary Examiner*—Ronald W. Griffin
*Attorney, Agent, or Firm*—Larry R. Swaney

[57] ABSTRACT

Thermoplastic elastomeric compositions, comprising blends of high unsaturation diene rubber and polypropylene in which the rubber is cured with certain curatives, exhibit superior properties.

32 Claims, No Drawings

4,271,049

ELASTOPLASTIC COMPOSITIONS OF CURED DIENE RUBBER AND POLYPROPYLENE

This invention relates to elastoplastic compositions, and, more particularly, to blends of cured diene rubber and polypropylene, and especially to compositions in which the rubber is cured with certain curatives.

BACKGROUND OF THE INVENTION

Thermoplastic elastomeric (elastoplastic) compositions comprising blends of cured rubber and polyolefin resin are known, (Gessler et al, U.S. Pat. No. 3,037,954; Coran et al, U.S. Pat. No. 4,104,210; and Campbell et al, *Natural Rubber Technology*, Volume 9, Part 2, 1978, pages 21 through 31). Gessler indicated that conventional rubber curatives were suitable for preparing blends containing high proportions of polypropylene. Coran recommended curative systems comprising bis-maleimide and, also, particularly recommended efficient or semi-efficient sulfur curative systems comprising high accelerator/sulfur ratios for preparing blends containing high proportions of rubber. Campbell et al described the preparation of rubber-polyolefin resin blends using organic peroxide curatives. The aforesaid blends exhibit limited durability as measured by true stress at break or limited elastic recovery (resistance to set). Higher strength compositions could be obtained by increasing the relative proportion of polyolefin resin, but the gain in strength was obtained at the expense of elastic recovery. Increasing the relative proportion of rubber improved elastic recovery, but it also decreased ultimate elongation, tensile strength and true stress at break.

SUMMARY OF THE INVENTION

It has now been found that, by the use of certain curatives, unique thermoplastic elastomeric compositions comprising blends of polypropylene and cured polybutadiene or polyisoprene rubber can be prepared. These compositions exhibit extraordinarily superior combinations of physical properties. For example, the blends of this invention exhibit high tensile strength, high elongation, and low tension set, which combination of properties is unique. In particular, the properties of the blends of this invention are such that the products of the true stress at break (TSB) times elastic recovery (R) is equal to 70 megapascals (MPa) or more. In preferred compositions of the invention, true stress at break times recovery is at least 75 MPa or at least 80 MPa in more preferred compositions.

The improved elastoplastic composition of the invention comprises a blend of crystalline polypropylene, in an amount sufficient to impart thermoplasticity to the composition, and cured diene rubber, selected from the group consisting of natural or synthetic polyisoprene rubber, polybutadiene rubber, and styrene-butadiene rubber comprising a copolymer of butadiene and up to 25 weight percent of styrene or methylstyrene, the rubber being in an amount sufficient to impart rubber-like elasticity to the composition, which rubber is in the form of dispersed particles of a size small enough to maintain strength and thermoplasticity of the composition and wherein the rubber is cured with rubber curative selected from the group consisting of phenolic curative, urethane curative, and sulfur donor curative, in an amount sufficient so that the properties of the blend are such that the product of the true stress at break times elastic recovery is equal to or more than 70 MPa.

The relative proportions of polypropylene and rubber are not subject to absolute delineation because the limits vary due to a number of factors including type, molecular weight, or molecular weight distribution of the polypropylene or rubber, the type of rubber, and type of curative used to cure the rubber. The operative proportions for any blend of which the composition is comprised may be ascertained in a few simple experiments by those skilled in the art by following the teachings herein. Generally, the compositions of the invention comprise blends of about 25–75 parts by weight thermoplastic crystalline polypropylene and correspondingly about 75–25 parts by weight of rubber per 100 total parts by weight of polypropylene and rubber. Blends containing lower proportions of polypropylene exhibit better properties with blends containing polyisoprene rubber, either natural or synthetic, than corresponding blends containing polybutadiene-based rubber, whereas, blends containing higher proportions of polypropylene exhibit better properties with blends containing polybutadiene-based rubber than blends containing polyisoprene rubber. Accordingly, a preferred composition of the invention comprises a blend of about 35–65 parts by weight of polypropylene and correspondingly, about 65–35 parts by weight of polyisoprene rubber or a blend of about 45–70 parts by weight of polypropylene and correspondingly, about 55–30 parts by weight of polybutadiene-base rubber.

It is important that the cured rubber is present in the form of small dispersed particles, otherwise, the composition will either be weak or not processable as a thermoplastic, or both. If the rubber is not dispersed and forms a somewhat continuous phase throughout the blend, a thermoset composition not processable as a thermoplastic may be obtained. The dispersed rubber particles must be small enough to maintain strength and thermoplasticity of the composition. If the particles are too large, weak, low strength blends are obtained. Compositions containing still larger particles may not be processable as thermoplastics. Accordingly, it is understood that in compositions of the invention the particle size is small enough to maintain high strength and thermoplasticity. Generally, the cured rubber particles are of a size of about 50 microns number average or less. The smaller the particle size the better the properties, including strength and processability. Preferably, the particle size is about 10 microns number average or less. The dynamic curing process, when carried out properly, can give cured rubber particles within the range of about 0.1 to 2 microns number average.

In order to achieve the improved compositions of the invention, it is essential that the rubber is cured with rubber curatives selected from the group consisting of phenolic curative, urethane curative, and sulfur-donor curative. The amount of curative must be enough so that the rubber is cured sufficiently to give a composition having tensile strength, elongation and tension set properties so that the product of the true stress at break times recovery is 70 MPa or more. It will be appreciated that blends exhibiting such good properties have not been obtained using conventional curatives such as peroxide curatives or curatives containing free sulfur. It should also be understood that the compositions of the invention, although containing rubber cross-linked to the extent that the crosslink density of the rubber is in the order of about $3 \times 10^{-5}$ or more moles per milliliter of rubber, process as a thermoplastic yet are further characterized as being elastomeric having tension set values of about 60 percent or less but preferably below 50 percent.

The compositions of the invention are preferably prepared by a dynamic curing process which comprises masticating a mixture of melted polypropylene, rubber, and curative at a curing temperature until curing is complete. Conventional rubber masticating equipment, for example, Banbury Mixer, Brabender Mixer, and mixing extruders, may be used to carry out the dynamic vulcanization process. The polypropylene and rubber typically are mixed at a temperature above the polypropylene melting point, after which curative is added. Mastication at vulcanization temperature is continued until vulcanization is complete, which generally is within a few minutes, depending on the temperature. To obtain thermoplastic elastomeric compositions, it is desirable that mixing continues without interruption until vulcanization is complete. If appreciable curing is allowed after mixing has stopped, a thermoset unprocessable composition may be obtained. Frequently, the cured blend is removed from the mixer and cooled, then returned and masticated again above the melting point of the polypropylene. The additional mastication step may generally improve the processability of the composition, especially when higher proportions of rubber are used. For further details concerning dynamic vulcanization and determination of the extent of cure of the rubber, refer to the Coran et al patent, supra, particularly Columns 3 and 4.

The particular results obtained by the aforesaid dynamic curing process are a function of the particular rubber curing system selected. It has now been found that phenolic curative, urethane curative and sulfur-donor curative give improved compositions heretofore not obtained. Preferably, enough curative is used to crosslink the rubber to the extent that the crosslink density of the rubber is in the order of about $3 \times 10^{-5}$ to $1 \times 10^{-3}$ moles per milliliter of rubber. Of course, the crosslink density should not be too high lest the properties of the composition be impaired.

One embodiment of the invention comprises compositions comprising blends of rubber and polypropylene in which the rubber is cured with phenolic curative comprising phenolic curing resin and zinc oxide is predispersed form. It has been found that, instead of adding the zinc oxide as a powder to the blend, adding the zinc oxide in the form of a polymer masterbatch gives compositions exhibiting superior properties. A zinc oxide-polymer masterbatch can be prepared by mixing zinc oxide and polymer in a weight ratio of about 5/1 to 1/5 and preferably in a weight ratio of about 2/1 to 1/2 until the zinc oxide is dispersed throughout the polymer. Any compatible solid or rubbery thermoplastic polymer is suitable for preparing the zinc oxide masterbatch but it is convenient to use either the rubber or more preferably the polypropylene component of the blend composition to be prepared. Typically, the amount of zinc oxide charged either as neat material or predispersed in the form of a masterbatch is between about 0.1 to 10 parts by weight of zinc oxide per 100 parts by weight of rubber in the final blend. It is believed that predispersed zinc oxide disperses more quickly with enhanced ability to promote the crosslinking of the rubber by the phenolic curing resin.

Rubber suitable for the practice of the invention comprises essentially rubbery polymers of isoprene, 1,3-butadiene and copolymers of 1,3-butadiene and up to about 25 weight percent of styrene or alpha-methyl styrene. Both natural and synthetic polyisoprene rubber are suitable. Commercially available rubbers suitable for the practice of the invention are described in *Rubber World Blue Book*, 1975 Edition, Materials and Compounding Ingredients for Rubber as follows: Natural Rubber, pages 389–394, Polybutadiene Rubber, pages 431–432, Polyisoprene Rubber, pages 439–440, and Styrene-Butadiene Rubber, Pages 452–460.

Suitable polypropylene resins comprise crystalline high molecular weight solids from the polymerization of propylene. Commercially available grades of polypropylene resin are preferred.

Any phenolic curative which cures the rubber is suitable in the practice of the invention. A particularly suitable phenolic curative is a phenolic curing resin made by condensation of halogen substituted phenol, $C_1$–$C_{10}$ alkyl substituted phenol (preferably substituted in the paraposition), or non-substituted phenol with an aldehyde (preferably formaldehyde) in an alkaline medium or by condensation of bi-functional phenol dialcohols. Dimethylol phenols substituted with $C_5$–$C_{10}$ alkyl in the para-position are more preferred. Halogenated alkyl substituted phenol curing resins prepared by halogenation of alkyl-substituted phenol curing resins also can be used. Phenolic curing systems may comprise methylol phenolic resins with or without activator such as halogen donor and metal compound. Details of this are described in Giller, U.S. Pat. No. 3,287,440 and Gerstin et al, U.S. Pat. No. 3,709,840. Non-halogenated phenolic curing resins may be used in conjunction with halogen donors, preferably along with a hydrogen halide scavenger. Sometimes, halogenated, preferably brominated, phenolic resins containing 2 to 10 weight percent bromine are used in conjunction with a hydrogen halide scavenger such as metal oxides, for example, iron oxide, titanium oxide, magensium oxide, magnesium silicate, silicon dioxide, and preferably zinc oxide. The presence of metal oxide and halogen donor singly or together promote the crosslinking function of the phenolic resin. The preparation of halogenated phenolic resin and their use in a curative system comprising zinc oxide are described in U.S. Pat. Nos. 2,972,600 and 3,093,613, the disclosure of which is incorporated herein by reference. When using either a halogenated phenolic curing resin or halogen donor activator, it is essential that the total amount of metal halide (present initially or formed in situ) does not exceed two parts by weight per 100 parts by weight of rubber. Preferred phenolic curing resins contain between about 5–15 weight percent methylol groups. A preferred phenolic curative comprises a non-halogenated dimethylol phenolic resin and zinc oxide.

Examples of suitable halogen donors and metal halide activators are stannous chloride, ferric chloride, or halogen donating polymer such as chlorinated paraffin, chlorinated polyethylene, chlorosulfonated polyethylene, and polychlorobutadiene (Neoprene rubber). The term "activator", as used herein, means any material which materially increases the crosslinking efficiency of the phenolic curative resin and includes metal oxides and halogen donors used alone or conjointly.

Suitable phenolic resin curatives are commercially available; for example, such curatives may be purchased under the trade name SP-1045, CRJ-352, and SP-1056 from Schnectady Chemicals Company, Inc. Preferably sufficient quantities of curatives are used to achieve essentially complete cure of the rubber.

Suitable urethane curatives include rubber crosslinking agents which are prepared by the reaction of a C-nitroso phenol and a diisocyanate; for example, p-nitrosophenol and dicyclohexylmethane 4,4' diisocyanate. Urethane curatives are sold under the trade name of Novor by Hughson Chemicals. For additional details of urethane curing systems and their use, refer to *Rubber Chemistry & Technology*, Volume 43, pages 510–521; and *Journal of Elastomers & Plastics*, 1977, Volume 9, pages 249–266, the disclosures of which are incorporated herein by reference.

The sulfur donor curative systems suitable in the practice of the invention comprise conventional sulfur donor vulcanizing agents. However, it is important that the sulfur donor curative is used without the presence of elemental sulfur (0.2 parts of free sulfur or less per 100 parts of rubber). If sulfur is present, the superior compositions of the invention are not obtained. Types of suitable sulfur donors include alkyl polysulfides, thiuram disulfides, and amine polysulfides. Examples of suitable sulfur donors are 4,4'-dithiomorpholine, dithiodiphosphorodisulfides, diethyldithiophosphate polysulfide, alkyl phenol disulfide, and tetramethylthiuram disulfide. The sulfur-donors may be used with conventional sulfur-vulcanizing accelerators, for example, thiazole accelerators such as benzothiazyl disulfide, N-cyclohexyl-2-benzothiazolesulfenamide, 2-mercaptobenzothiazole, N-tert.-butyl-2-benzothiazolesulfenamide, 2-benzothiazyl-N,N-diethylthiocarbamyl sulfide, 2-(morpholinodithio)benzothiazole, and N,N-dimorpholinodithiocarbamate.

The properties of the elastoplastic compositions of the invention may be modified either before or after vulcanization by the addition of conventional compounding ingredients for rubber, polypropylene, and blends thereof. Examples of such ingredients include particulate fillers such as carbon black, silica, titanium dioxide, colored pigments, clay and zinc oxide, stabilizers, antidegradants, flame retardants, processing aids, tackifiers, plasticizers, wax, discontinuous fibers, and extender oils. Carbon black and extender oil preferably are added prior to dynamic vulcanization. Extender oil can improve the resistance to oil swell, heat stability, hysteresis, cost and permanent set of the composition. The addition of extender oil can also improve processability. Fillers and oil can be added to the rubber to make a masterbatch before melt mixing with polypropylene. Suitable extender oils are described in *Rubber World Blue Book*, supra, pages 145–190. Quantities of carbon black and extender oil are those used typically by compounders for rubber compositions. The elastoplastic compositions of the invention are useful for making a variety of articles such as tires, hoses, tubing, belts, gaskets, molding, and molded parts.

The stress-strain properties of the compositions are determined in accordance with the test procedures set forth in ASTM D-1708-66. Test specimens are pulled with an Instron Tester at 2.5 cm. per minute up to 30% elongation and 25.4 cm. per minute to failure. The term "elastomeric" as used herein means a composition which possesses the property of forceably retracting within a given period of time (1 or 10 minutes) to about 160 percent or less of its original length after being stretched at room temperature to twice its unstressed length and held for the same period of time (1 or 10 minutes) before release. True stress at break (TSB) is the tensile strength at break multiplied by the extension ratio also at break, extension ratio being the length of a tensile test specimen at break divided by the original, unstressed length of the test specimen. Alternately, extension ratio is 1.00 plus 1/100 of the percent ultimate elongation. Elastic Recovery (R) is the difference between unity and 1/100 of the percent tension set (from a 10 minute 100% tensile strain test, ASTM D-412). A performance factor for relating the overall properties of an elastoplastic composition is obtained by multiplying the true stress at break times recovery. The compositions of the invention exhibit a value of at least 70 MPa, preferably at least 75 or more preferably, at least 80 MPa calculated in this manner.

Since the determination of ultimate elongation is important for the calculation of the true stress at break used in the estimation of the performance factor, $TSB \times R$, the method of determining ultimate elongation used herein is put forth herewith in detail and the method is thereby part of the definition of the percent ultimate elongation or elongation at break used herein. The microdumbell tensile test specimen (ASTM D1708 -66) has a test length of 0.876 inches (2.23 cm). An Instron tensile tester was used to pull the specimens apart during the test for tensile strength and ultimate elongation. The tester is designed to measure changes in jaw separation in inches. Though the initial jaw separation was adjusted, according to the ASTM procedure, to 0.90 inches (2.29 cm) and the specimen length and jaw separation are not 1.00 inches (2.54 cm), the elongation at break was read as the jaw separation increases, in inches. The percent ultimate elongation or elongation at break was calculated by multiplying the change in jaw separation required to break the specimen (measured in inches) by 100. It is true that the original unstrained sample length was 0.876 inches (not 1.00 inches) and one might expect that the change (in inches) in jaw separation should be divided by 0.876 inches as well as being multiplied by 100. However, it is also true that some flow of the specimen occurs in the jaws, which flow, in effect, somewhat increases the initial or unstrained length. Since the effective length change due to flow of the specimen in the jaws is difficult to measure in each case, and since the effect of this is in the opposite direction of not dividing by 0.876, it was found expedient to estimate the percent ultimate elongation or elongation at break, merely by multiplying the jaw separation to break (measured in inches) by 100. The actual value may deviate from this somewhat, however, the method presented herewith is incorporated into the definition for percent elongation used herein.

DESCRIPTION OF PREFERRED EMBODIMENTS

Unless indicated otherwise, the procedure for the preparation of compositions of the following examples comprises mixing in the indicated proportions rubber and polypropylene in a Brabender Mixder with an oil bath temperature of about 180°–190° C. The mixing speed may vary from 50–150 rpm. The rubber and polypropylene are mixed for sufficient time to melt the polpropylene and to obtain a uniform blend. Curative is then added and mastication is continued for sufficient time (generally between 2 and 6 minutes) to obtain a maximum Brabender consistency. Mixing is then continued for an additional 2 to 3 minutes. The compositions are removed from the mixer and then returned to the Brabender and mixed an additional 1 to 2 minutes.

The material is then sheeted and compression molded at 200°-210° C. Properties of the molded sheet are then measured and recorded. As a rough measure of the extent of cure, sample specimens about 0.05 mm thick are extracted by toluene at room temperature for 48 hours. The percent weight loss of the dried specimen is then measured. The extractable portion includes soluble low molecular weight materials in the polypropylene, soluble non-crosslinkable materials in the rubber, soluble by-products of the curing systems, unused curatives, and uncured rubber. The data indicates that the rubber is fully cured.

Ingredients used to illustrate the invention are low flow, general purpose grade polypropylene, specific gravity 0.903, tensile strength at yield 359 Kg./cm.$^2$, purchased as Profax ® 6723 polypropylene. Sulfur accelerator is N-cyclohexyl-2-benzothiazole-sulfenamide sold as Santocure ® accelerator. Vulcanizing agent is 4,4-dithiodimorpholine sold as Sulfasan ® R vulcanizing agent. Dithiocarbamate accelerator is tetramethylthiuramdisulfide sold as Thiurad ® accelerator, except in the case of urethane crosslinker, where the dithiocarbamate accelerator is zinc dimethyldithiocarbamate sold as Methasan ® accelerator. The phenolic curative resin is believed to be mainly dimethylol-p-octylphenol and was purchased under the trade name SP-1045. Urethane crosslinker is purchased under the trade name Novor ® 924. Antidegradant is polymerized 1,2-dihydro-2,2,4-trimethylquinoline sold as Flectol ® H antioxidant. All ingredients, including polypropylene and rubber, as shown in the tables, are in parts by weight. Examples of compositions of the invention are shown in Tables 1–9.

Compositions comprising a blend of polypropylene and natural rubber in which the rubber is cured with sulfur donor curative are shown in Table 1. Both the 4,4-dithiodimorpholine vulcanizing agent (Sulfasan R) and the dithiocarbamate accelerator (Thiurad) are sulfur donors, though the dithiocarbamate is also a potent accelerator. Stocks 1–5 illustrate the effect of curative concentration on properties. The data indicate that about 1.25 parts by weight each of sulfenamide accelerator, dithiocarbamate accelerator and vulcanizing agent per 100 parts by weight rubber are needed to obtain properties sufficient to obtain a value of the product of true stress at break times recovery of about 70 Mpa or more. The data further indicate that, with this particular curative system and at the 1/1/1 ratio used, the optimum amount is about 2 parts of each by weight per 100 parts by weight of rubber. Significantly, in other studies using an efficient curative system containing free sulfur, properties as high as 70 MPa were not achieved regardless of the curative level used. Stocks 6–10 illustrate the effect of varying the polypropylene-natural rubber ratio. The curative level is kept constant at 1.75 parts by weight per 100 parts by weight rubber. The data show that increasing the amount of polypropylene increases tensile strength (TS) and ultimate elongation but adversely affects tension set. A plot of TSB×R shows that a maximum value is obtained with a composition comprising 40 parts polypropylene and 60 parts natural rubber. The date also indicate that properties wherein TSB×R is 70 MPa or more are obtained over the range of about 35–65 parts by weight of polypropylene.

Compositions of the invention comprising polypropylene and natural rubber in which the rubber is cured with urethane crosslinker are illustrated in Table 2. The effect of curative concentration is also shown. The data indicate that about 8 parts by weight of urethane crosslinker per 100 parts by weight of rubber are needed to obtain a composition exhibiting properties which gives TSB×R of at least 70 MPa.

TABLE 1

| Stock | 1 | 2 | 3 | 4 | 5 | 6 | 7 | 8 | 9 | 10 |
|---|---|---|---|---|---|---|---|---|---|---|
| Polypropylene | 50 | 50 | 50 | 50 | 50 | 30 | 40 | 50 | 60 | 70 |
| Natural Rubber | 50 | 50 | 50 | 50 | 50 | 70 | 60 | 50 | 40 | 30 |
| Antidegradant | 0.5 | 0.5 | 0.5 | 0.5 | 0.5 | 0.7 | 0.6 | 0.5 | 0.4 | 0.3 |
| Zinc Oxide | 2.5 | 2.5 | 2.5 | 2.5 | 2.5 | 3.5 | 3.0 | 2.5 | 2.0 | 1.5 |
| Stearic Acid | 0.5 | 0.5 | 0.5 | 0.5 | 0.5 | 0.7 | 0.6 | 0.5 | 0.4 | 0.3 |
| Santocure ® | 0.25 | 0.5 | 0.75 | 1.0 | 1.5 | 1.225 | 1.05 | 0.875 | 0.70 | 0.525 |
| Thiurad ® Accelerator | 0.25 | 0.5 | 0.75 | 1.0 | 1.5 | 1.225 | 1.05 | 0.875 | 0.70 | 0.525 |
| Sulfasan ® Vulcanizing Agent | 0.25 | 0.5 | 0.75 | 1.0 | 1.5 | 1.225 | 1.05 | 0.875 | 0.70 | 0.525 |
| Properties |  |  |  |  |  |  |  |  |  |  |
| TS, MPa (a) | 11.6 | 19.9 | 23.5 | 24.4 | 22.4 | 15.7 | 21.1 | 23.0 | 25.0 | 25.3 |
| $M_{100}$, MPa | 8.0 | 9.7 | 9.8 | 10.7 | 10.8 | 5.4 | 7.7 | 10.2 | 12.4 | 13.9 |
| E, MPa | 105 | 82 | 82 | 82 | 102 | 11 | 28 | 93 | 186 | 270 |
| Elong., % (b) | 410 | 450 | 490 | 460 | 400 | 360 | 430 | 470 | 500 | 550 |
| Tension Set, % (c) | 66 | 49 | 41 | 37 | 36 | 12 | 23 | 37 | 51 | 62 |
| Recovery, R, (1−c/100) | 0.34 | 0.51 | 0.59 | 0.63 | 0.64 | 0.88 | 0.77 | 0.63 | 0.49 | 0.38 |
| TSB, MPa (1+b/100)a) | 59 | 109 | 138 | 136 | 112 | 72 | 112 | 132 | 151 | 164 |
| TSB × R, MPa | 20 | 56 | 82 | 86 | 72 | 64 | 86 | 83 | 74 | 62 |
| Wt. %, Soluble | 11.0 | 6.1 | 4.7 | 4.5 | 3.8 | 6.8 | 5.2 | 4.2 | 7.7 | 4.0 |

TABLE 2

| Stock | 1 | 2 | 3 | 4 | 5 |
|---|---|---|---|---|---|
| Polypropylene | 50 | → | → | → | → |
| Natural Rubber | 50 | → | → | → | → |
| Antidegradant | 0.5 | → | → | → | → |
| Zinc Oxide | 2.5 | → | → | → | → |
| Stearic Acid | 0.5 | → | → | → | → |
| Novor 924 Crosslinker | 3.35 | 5.025 | 6.7 | 6.7 | 8.375 |
| Methasan ® Accelerator | 0.5 | 0.75 | 0.5 | 1.0 | 1.25 |
| Properties |  |  |  |  |  |
| TS, MPa | 22.1 | 22.7 | 22.9 | 24.4 | 24.3 |
| $M_{100}$, MPa | 10.9 | 11.2 | 11.7 | 11.8 | 11.9 |
| E, MPa | 92 | 96 | 87 | 91 | 99 |
| Elong., % | 400 | 390 | 370 | 380 | 370 |
| Tension Set, % | 42 | 35 | 33 | 33 | 39 |
| Recovery, R | 0.58 | 0.65 | 0.67 | 0.67 | 0.61 |
| TSB, MPa | 111 | 111 | 108 | 117 | 114 |
| TSB × R MPa | 64 | 72 | 72 | 78 | 70 |
| Wt. %, Soluble | 4.8 | 5.1 | 4.6 | 5.9 | 10.4 |

Compositions of the invention comprising polypropylene and natural rubber in which the rubber is cured with phenolic curative are illustrated in Table 3. Stocks 1-5 illustrate the effect of varying polypropylene-natural rubber ratio. The phenolic curative level is kept constant at 15 parts by weight per 100 parts by weight rubber. A plot of TSB×R versus polymer concentration ratio shows that a maximum value is obtained with a 50/50 composition. Stocks 6-9 illustrate the effect of varying the amount of phenolic curative. The data show that compositions exhibiting excellent properties are obtained over a wide range of curative concentration.

Compositions of the invention comprising polypropylene and natural rubber in which the rubber is cured with phenolic curative comprising phenolic curing resin and zinc oxide in predispersed form are illustrated in Table 4. The zinc oxide is added as a 1/1 masterbatch of zinc oxide and polypropylene. The amount of zinc oxide shown is as neat material. The amount of masterbatch added is double the amount shown, but when preparing the compositions, the amount of neat polypropylene added is adjusted to take into account the amount of polypropylene in the zinc oxide masterbatch. Thus, the amount of polypropylene indicated as being present represents the total amount of polypropylene in the blend added as neat material and as masterbatch. The data indicate that adding the zinc oxide in predispersed form results in compositions exhibiting improved properties including tensile strength and the performance factor TSB×R. For example, compare Stock 6 with Stock 7 of Table 3.

Compositions of the invention comprising styrene butadiene rubber and synthetic polyisoprene rubber are illustrated in Table 5. Stock 1 shows a composition containing a 50/50 blend of polypropylene and a butadiene copolymer rubber containing about 23.5% bound styrene in which the rubber is cured with phenolic curative. Stocks 2 and 3 illustrate composition comprising polyisoprene rubber in which the rubber is cured with phenolic curative and sulfur donor curative respectively.

TABLE 3

| | 1 | 2 | 3 | 4 | 5 | 6 | 7 | 8 | 9 |
|---|---|---|---|---|---|---|---|---|---|
| Stock | | | | | | | | | |
| Natural Rubber | 70 | 60 | 50 | 40 | 30 | 50 | 50 | 50 | 50 |
| Polypropylene | 30 | 40 | 50 | 60 | 70 | 50 | 50 | 50 | 50 |
| Antidegradant | 0.7 | 0.6 | 0.5 | 0.4 | 0.3 | 0.5 | 0.5 | 0.5 | 0.5 |
| Zinc Oxide | 3.5 | 3.0 | 2.5 | 2.0 | 1.5 | 2.5 | 2.5 | 2.5 | — |
| SP1045 phenolic curative | 10.5 | 9.0 | 7.5 | 6.0 | 4.5 | 5.0 | 7.5 | 10.0 | 12.5 |
| Properties | | | | | | | | | |
| TS, MPa | 13.8 | 21.6 | 25.9 | 23.9 | 25.4 | 25.0 | 26.2 | 25.3 | 22.2 |
| $M_{100}$, MPa | 6.8 | 8.6 | 10.1 | 11.6 | 13.9 | 9.9 | 10.9 | 11.6 | 9.4 |
| E, MPa | 12 | 37 | 73 | 132 | 231 | 83 | 81 | 72 | 70 |
| Elong., % | 250 | 380 | 460 | 500 | 550 | 510 | 460 | 410 | 500 |
| TSB, MPa | 48 | 103 | 145 | 143 | 166 | 153 | 147 | 129 | 133 |
| Tension Set, % | 10 | 21 | 39 | 50 | 64 | 41 | 35 | 30 | 40 |
| Recovery, R | 0.9 | 0.79 | 0.61 | 0.5 | 0.36 | 0.59 | 0.65 | 0.70 | 0.60 |
| TSB × R, MPa | 43 | 81 | 88 | 72 | 60 | 90 | 96 | 90 | 80 |
| Wt. %, Soluble | 2.9 | 3.8 | 3.3 | 4.5 | 2.8 | 3.7 | 2.8 | 4.4 | 7.9 |

TABLE 4

| | 1 | 2 | 3 | 4 | 5 | 6 | 7 | 8 | 9 | 10 |
|---|---|---|---|---|---|---|---|---|---|---|
| Stock | | | | | | | | | | |
| Natural Rubber | 75 | 70 | 65 | 60 | 55 | 50 | 45 | 40 | 35 | 30 |
| Polypropylene | 25 | 30 | 35 | 40 | 45 | 50 | 55 | 60 | 65 | 70 |
| Antidegradant | 0.75 | 0.7 | 0.65 | 0.6 | 0.55 | 0.5 | 0.45 | 0.4 | 0.35 | 0.3 |
| Zinc Oxide (predispersed) | 3.75 | 3.5 | 3.25 | 3.0 | 2.75 | 2.5 | 2.25 | 2.0 | 1.75 | 1.5 |
| SP1045 phenolic curative | 11.25 | 10.5 | 9.75 | 9.0 | 8.25 | 7.5 | 6.75 | 6.0 | 5.25 | 4.5 |
| Properties | | | | | | | | | | |
| TS, MPa | 17.4 | 21.9 | 27.0 | 26.4 | 26.8 | 29.4 | 29.7 | 30.1 | 28.4 | 28.4 |
| $M_{100}$, MPa | 6.5 | 8.3 | 9.9 | 10.7 | 11.0 | 12.3 | 13.1 | 13.9 | 14.8 | 15.7 |
| E, MPa | 15 | 25 | 41 | 46 | 73 | 90 | 137 | 198 | 271 | 309 |
| Elong., % | 290 | 330 | 380 | 390 | 400 | 460 | 480 | 530 | 540 | 560 |
| Tension Set, % | 10 | 14 | 18 | 24 | 28 | 36 | 43 | 51 | 60 | 65 |
| Recovery, R | 0.90 | 0.86 | 0.82 | 0.76 | 0.72 | 0.64 | 0.57 | 0.49 | 0.40 | 0.35 |
| TSB, MPa | 68 | 94 | 130 | 129 | 134 | 165 | 172 | 190 | 182 | 187 |
| TSB × R, MPa | 61 | 81 | 107 | 98 | 96 | 106 | 98 | 93 | 73 | 65 |

TABLE 5

| | 1 | 2 | 3 |
|---|---|---|---|
| Stock | | | |
| SBR Rubber-1502 | 50 | — | — |
| Polyisoprene Rubber (Natsyn 2200) | — | 50 | 50 |
| Polypropylene | 50 | 50 | 50 |
| Antidegradant | 0.5 | 0.5 | 0.5 |
| Zinc Oxide | 1.0 | 2.5 | 2.5 |
| SP1045 Phenolic curative | 6.25 | 7.5 | — |
| Stearic Acid | — | — | 0.5 |
| Sulfenamide Accelerator | — | — | 0.5 |
| Dithiocarbamate Accelerator | — | — | 0.5 |
| Vulcanizing Agent | — | — | 0.5 |
| Properties | | | |
| TS, MPa | 23.8 | 24.4 | 22.0 |
| $M_{100}$, MPa | 12.9 | 10.4 | 9.7 |
| E, MPa | 140 | 76 | 76 |
| Elong., | 400 | 450 | 490 |
| TSB, MPa | 120 | 135 | 130 |
| Tension Set, % | 38 | 35 | 42 |
| Recovery R | 0.62 | 0.65 | 0.58 |
| TSB × R, MPa | 74 | 88 | 75 |
| Wt. %, Soluble | — | 2.7 | 4.3 |

Compositions of the invention comprising polybutadiene rubber cured with phenolic curative are illustrated in Table 6 and the effect of curative concentration is studied. The data of Stocks 1 and 2 indicate that zinc oxide is needed with 8 parts by weight of phenolic curing resin per 100 parts by weight of rubber in order to obtain a value greater than 70 MPa for the product of the true stress at break times recovery. Stocks 4-9 indicate that with 10 parts by weight of phenolic curing resin or more per 100 parts by weight of rubber, zinc oxide is no longer required.

The effect of varying polymer ratio in compositions containing polybutadiene rubber and phenolic curative is shown in Table 7. The data show that a value of TSB×R equal to 70 MPa or more is obtained over the range of about 45-65 parts by weight of polypropylene.

Compositions of the invention comprising polybutadiene rubber cured with sulfur donor curative are shown in Stocks 1 and 2 of Table 8. Stocks 3-5 illustrate that zinc stearate may be substituted for zinc oxide.

Compositions of the invention containing carbon black and extender oil are illustrated in Table 9. The zinc oxide was added in predispersed form in polypropylene in a 1/1 ratio. Stock 1 is a control containing 50/50 polypropylene and natural rubber but no black or oil. Stock 2 contains 50 parts by weight of carbon black per 100 parts by weight of rubber. Stock 3 contains 50 parts by weight of extender oil per 100 parts by weight of rubber. Stock 4 contains 50 parts by weight each of carbon black and oil per 100 parts by weight of rubber. Stock 5 contains 80 parts by weight extender oil per 100 parts by weight of rubber. The data show that the addition of either carbon black or extender oil reduces the performance factor TSB×R and that the effect is cumulative, i.e., increasing the amounts of additive further reduces the performance factor. If it were not for the superior properties of the neat blend, the compositions containing carbon black and extender oil would not exhibit such superior properties.

TABLE 6

| | 1 | 2 | 3 | 4 | 5 | 6* | 7 | 8 | 9 |
|---|---|---|---|---|---|---|---|---|---|
| Stock | | | | | | | | | |
| Polypropylene | 50 | 50 | 50 | 50 | 50 | 50 | 50 | 50 | 50 |
| Polybutadiene Rubber (Cis-1203) | 50 | 50 | 50 | 50 | 50 | 50 | 50 | 50 | 50 |
| Zinc Oxide | — | 1.25 | 5.0 | — | 2.5 | — | — | 1.25 | 2.5 |
| Antidegradant | — | — | — | 0.5 | — | 0.5 | 0.5 | — | — |
| SP-1045 phenolic curative | 4.0 | 4.0 | 4.0 | 5.0 | 6.0 | 6.25 | 7.5 | 8.0 | 10.0 |
| Properties | | | | | | | | | |
| TS, MPa | 17.2 | 20.2 | 20.7 | 18.2 | 21.4 | 20.2 | 19.9 | 20.9 | 21.8 |
| $M_{100}$, MPa | 10.0 | 11.8 | 11.2 | 10.9 | 11.5 | 11.7 | 11.6 | 12.2 | 11.8 |
| E, MPa | 91 | 103 | 95 | 148 | 84 | 139 | 131 | 94 | 82 |
| Elong., % | 450 | 450 | 460 | 510 | 420 | 460 | 460 | 350 | 390 |
| Tension Set, % | 33 | 29 | 30 | 35 | 28 | 31 | 30 | 26 | 27 |
| Recovery, R | 0.67 | 0.71 | 0.70 | 0.65 | 0.72 | 0.69 | 0.70 | 0.74 | 0.73 |
| TSB, MPa | 95 | 111 | 117 | 110 | 111 | 113 | 112 | 94 | 106 |
| TSB × R, MPa | 64 | 79 | 82 | 72 | 80 | 78 | 78 | 70 | 77 |

*Stock 6 represents the average of data obtained from four duplicate runs

TABLE 7

| | 1 | 2 | 3 | 4 |
|---|---|---|---|---|
| Stock | | | | |
| Polypropylene | 40 | 50 | 60 | 70 |
| Polybutadiene Rubber (Cis-1203) | 60 | 50 | 40 | 30 |
| Zinc Oxide | 3.0 | 2.5 | 2.0 | 1.5 |
| SP-1045 Phenolic Curative | 7.2 | 6.0 | 4.8 | 3.6 |
| Properties | | | | |
| TS, MPa | 13.7 | 21.4 | 24.3 | 24.2 |
| $M_{100}$, MPa | 9.4 | 11.5 | 13.5 | 14.6 |
| E, MPa | 29 | 84 | 182 | 260 |
| Elong., % | 220 | 420 | 470 | 470 |
| Tension Set, % | 20 | 28 | 42 | 54 |
| Recovery, R | 0.80 | 0.72 | 0.58 | 0.46 |
| TSB, MPa | 44 | 111 | 138 | 138 |
| TSB × R, MPa | 35 | 80 | 80 | 64 |

TABLE 8

| | 1 | 2 | 3 | 4 | 5 |
|---|---|---|---|---|---|
| Stock | | | | | |
| Polypropylene | 55 | 55 | 55 | 55 | 70 |
| Polybutadiene Rubber (Cis-1203) | 45 | 45 | 45 | 45 | 30 |
| Antidegradant | 0.45 | 0.45 | 0.45 | 0.45 | 0.3 |
| Zinc Oxide | 2.25 | 2.25 | 2.25 | — | — |
| Zinc Stearate | — | — | — | 2.25 | 0.6 |
| SP-1045 Phenolic Curative | — | — | 5.4 | 5.625 | 3.75 |
| Santocure ® Accelerator | 0.788 | 0.984 | — | — | — |
| Thiurad ® Accelerator | 0.788 | 0.984 | — | — | — |
| Sulfasan ® Vulcanizing Agent | 0.788 | 0.984 | — | — | — |
| Properties | | | | | |
| TS, MPa | 22.7 | 22.7 | 22.4 | 24.3 | 26.2 |
| $M_{100}$, MPa | 12.9 | 13.2 | 12.7 | 13.0 | 15.5 |
| E, MPa | 202 | 217 | 162 | 143 | 302 |
| Elong., % | 440 | 410 | 470 | 450 | 540 |
| Tension Set, % | 39 | 39 | 35 | 35 | 52 |
| Recovery R | 0.61 | 0.61 | 0.65 | 0.65 | 0.48 |
| TSB, MPa | 121 | 115 | 128 | 134 | 168 |
| TSB × R, MPa | 74 | 40 | 83 | 87 | 81 |

TABLE 9

| | 1 | 2 | 3 | 4 | 5 |
|---|---|---|---|---|---|
| Stock | | | | | |
| Polypropylene | 50 | 50 | 50 | 50 | 50 |
| Natural Rubber | 50 | 50 | 50 | 50 | 50 |
| Antidegradant | 0.5 | 0.5 | 0.5 | 0.5 | 0.5 |
| Zinc Oxide (predispersed) | 2.5 | 2.5 | 2.5 | 2.5 | 2.5 |
| SP-1045 Phenolic Curative | 7.5 | 7.5 | 7.5 | 7.5 | 7.5 |
| Carbon Black | — | 25 | — | 25 | — |
| Extender Oil | — | — | 25 | 25 | 40 |
| Properties | | | | | |
| TS, MPa | 29.2 | 29.3 | 19.1 | 21.2 | 15.5 |
| $M_{100}$, MPa | 12.3 | 15.5 | 8.0 | 10.0 | 6.7 |
| E, MPa | 103 | 82 | 40 | 44 | 32 |
| Elong., % | 470 | 330 | 460 | 350 | 460 |
| Tension Set, % | 34 | 35 | 30 | 28 | 30 |
| Recovery, R | 0.66 | 0.65 | 0.70 | 0.72 | 0.70 |
| TSB, MPa | 166 | 126 | 107 | 95 | 87 |
| TSB × R, MPa | 110 | 82 | 76 | 68 | 61 |

Accordingly, it is understood that a composition containing diluents such as carbon black or extender oil and having a performance factor, TSB×R, below 70 MPa is within the invention so long as a comparable blend but free of these diluents exhibits a performance factor of 70 MPa or more.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. An elastoplastic composition comprising a blend of crystalline polypropylene, in an amount sufficient to impart thermoplasticity to the composition, and cured rubber selected from the group consisting of natural or synthetic polyisoprene rubber, polybutadiene rubber and styrene-butadiene rubber comprising a copolymer of butadiene and up to about 25 weight percent of styrene or α-methylsytrene, the rubber being in an amount sufficient to impart rubberlike elasticity to the composition, which rubber is in the form of dispersed particles of a size small enough to maintain strength and thermoplasticity of the composition and wherein the rubber is cured with rubber curative selected from the group consisting of phenolic curative, urethane curative, and sulfur-donor curative comprising 0.2 parts of free sulfur or less per 100 parts of rubber in an amount sufficient so that the properties of the blend are such that the product of the true stress at break (TSB) times elastic recovery (R) is at least 70 megapascals (MPa).

2. The composition of claim 1 comprising a blend of 25–75 parts by weight of polypropylene and correspondingly about 75–25 parts by weight of rubber per 100 total parts by weight of polypropylene and rubber.

3. The composition of claim 2 comprising a blend of about 35–65 parts by weight of polypropylene and about 65–35 parts by weight of natural or synthetic polyisoprene rubber in which TSB×R is at least 75 MPa.

4. The composition of claim 3 in which the rubber is cured with phenolic curative.

5. The composition of claim 4 in which the phenolic curative comprises about 8 to 25 parts by weight of dimethylol-p-alkylphenolic resin curative per 100 parts by weight of rubber.

6. The composition of claim 5 in which the phenolic curative comprises about 0.1 to 10 parts by weight zinc oxide per 100 parts by weight of rubber.

7. The composition of claim 6 in which the rubber is natural rubber and TSB×R is at least 80 MPa.

8. The composition of claim 7 in which the phenolic curative is dimethylol-p-octylphenolic resin curative.

9. The composition of claim 3 in which the rubber is cured with urethane curative.

10. The composition of claim 9 in which the rubber is natural rubber.

11. The composition of claim 10 in which the urethane curative comprises a reaction product of a C-nitroso phenol and a diisocyanate, and dithiocarbamate accelerator.

12. The composition of claim 3 in which the rubber is cured with sulfur-donor curative.

13. The composition of claim 12 in which the rubber is natural rubber.

14. The composition of claim 13 in which the sulfur-donor curative comprises sulfenamide accelerator, dithiocarbamate accelerator and amine sulfur-donor.

15. The composition of claim 3 in which the rubber is synthetic polyisoprene rubber.

16. The composition of claim 2 in which the rubber is styrene-butadiene rubber.

17. The composition of claim 2 in which the rubber is polybutadiene rubber.

18. The composition of claim 17 comprising a blend of about 45–70 parts by weight of polypropylene and about 55–30 parts by weight of polybutadiene rubber in which TSB×R is at least 75 MPa.

19. The composition of claim 18 in which the rubber is cured with phenolic curative and TSB×R is at least 80 MPa.

20. The composition of claim 19 in which the phenolic curative comprises about 8 to 25 parts by weight of dimthylol-p-alkylphenolic resin per 100 parts by weight of rubber.

21. The composition of claim 20 in which the phenolic curative is dimethylol-p-octylphenolic resin curative.

22. The composition of claim 18 in which the rubber is cured with urethane curative.

23. The composition of claim 22 in which the urethane curative comprises a reaction product of a C-nitroso phenol and a diisocyanate, and dithiocarbamate accelerator.

24. The composition of claim 18 in which the rubber is cured with sulfur-donor curative.

25. The composition of claim 24 in which the sulfur-donor curative comprises sulfenamide accelerator, dithiocarbamate accelerator and amine sulfide sulfur-donor.

26. An elastoplastic composition prepared by masticating, at a temperature at least sufficient to melt crystalline polypropylene until the rubber is cured, a blend comprising crystalline polypropylene, in an amount sufficient to impart thermoplasticity to the composition, rubber selected from the group consisting of natural or synthetic polyisoprene rubber, polybutadiene rubber and styrene-butadiene rubber comprising a copolymer of butadiene and up to about 25 weight percent styrene or α-methylstyrene, the rubber being in an amount sufficient to impart rubberlike elasticity to the composition, and rubber curative selected from the group consisting of phenolic curative, urethane curative, and sulfur-donor curative comprising 0.2 parts of free sulfur or less per 100 parts of rubber in an amount sufficient so that the properties of the blend after the rubber is cured are such that the product of the true stress at break (TSB) times elastic recovery (R) is at least 70 megapascals (MPa).

27. The composition of claim 26 comprising a blend of about 25–75 parts by weight of polypropylene and correspondingly about 75–25 parts by weight of rubber per 100 total parts by weight of polypropylene and rubber and TSB×R is at least 75 MPa.

28. The composition of claim 27 comprising a blend of about 35–65 parts by weight of polypropylene, about 65–35 parts by weight of natural rubber and about 8 to 25 parts by weight of dimethylol-p-alkylphenolic resin curative per 100 parts by weight of rubber and TSB×R is at least 80 MPa.

29. The composition of claim 28 in which the phenolic curative comprises zinc oxide in predispersed form.

30. A process for preparing elastoplastic compositions which comprises masticating at a temperature at least sufficient to melt crystalline polypropylene until the rubber is cured, a blend comprising about 65–35 parts by weight of crystalline polypropylene, and corresponding about 35–65 parts by weight natural rubber per 100 total parts by weight of polypropylene and rubber, and phenolic curative comprising about 8 to 25 parts by weight of dimethylol-p-alkylphenolic resin and zinc oxide in predispersed form, in an amount sufficient so that the properties of the blend after the rubber is cured are such that the product of the true stress at break times elastic recovery is at least 70 MPa.

31. The process of claim 30 in which the masticating temperature is between about 180°–250° C. and TSB×R is at least 80 MPa.

32. The process of claim 31 in which the phenolic resin curative is dimethylol-p-octylphenolic resin curative.

* * * * *

UNITED STATES PATENT AND TRADEMARK OFFICE
CERTIFICATE OF CORRECTION

PATENT NO. : 4,271,049
DATED : June 2, 1981
INVENTOR(S) : A. Y. Coran et al

It is certified that error appears in the above-identified patent and that said Letters Patent are hereby corrected as shown below:

Col. 2, line 30, "base" should be --based--.

Col. 3, line 46, "is" should be --in--.

Col. 6, line 31, "increases" should be --increase--.

Col. 6, line 58, "Mixder" should be --Mixer--.

Col. 12, Table 8, Stock 2, TSB X R, MPa "40" should be --70--.

Signed and Sealed this

Fourth Day of August 1981

[SEAL]

Attest:

Attesting Officer

GERALD J. MOSSINGHOFF

Commissioner of Patents and Trademarks